(12) United States Patent
Walter et al.

(10) Patent No.: US 7,033,528 B1
(45) Date of Patent: Apr. 25, 2006

(54) METHOD FOR MOLDING A SYNTHETIC PALLET, COMPOSITION AND PRODUCT BY PROCESS

(76) Inventors: Louis Walter, 10024 Robin Oaks Dr., Las Vegas, NV (US) 89117; Milan Radovanov, 4810 Rincon Rd., Corpus Christi, TX (US) 78402

( * ) Notice: Subject to any disclaimer, the term of this patent is extended or adjusted under 35 U.S.C. 154(b) by 0 days.

(21) Appl. No.: 10/948,373

(22) Filed: Sep. 22, 2004

(51) Int. Cl.
*B29C 44/02* (2006.01)

(52) U.S. Cl. .......................... 264/51; 264/54; 264/299; 264/328.1

(58) Field of Classification Search ............. 108/51.11; 264/51, 54, 53, 299, 328.1
See application file for complete search history.

(56) References Cited

U.S. PATENT DOCUMENTS

| | | | |
|---|---|---|---|
| 6,305,301 B1 * | 10/2001 | Piper et al. | 108/57.25 |
| 6,374,753 B1 | 4/2002 | Radke, Jr. | |
| 6,784,234 B1 * | 8/2004 | Adedeji et al. | 524/140 |

* cited by examiner

*Primary Examiner*—Allan R. Kuhns
(74) *Attorney, Agent, or Firm*—Robert Ryan Morishita; Morishita Law Firm, LLC

(57) ABSTRACT

A molded shipping pallet is set forth as well as a process for molding and composition therefore. The process includes pre-heating and mixing various meshes of ground, crumb rubber with other polymers and agents and introducing the composition into a mold to mold the pallet. The pallet is molded to have a shape and construction which minimizes weight yet provides strength.

8 Claims, 3 Drawing Sheets

METHOD FOR MOLDING A SYNTHETIC PALLET, COMPOSITION AND PRODUCT BY PROCESS

FIELD OF THE INVENTION

The present invention relates to a method for molding, composition and synthetic pallet of the type used to support goods for lifting using a forklift and for shipping.

BACKGROUND OF THE INVENTION

In the past, lifting and shipping pallets were manufactured from wood. The wood was typically nailed together to form top and bottom surfaces separated by a network of supporting braces. Goods, such as stacked material, would be loaded on the top surface. To lift and move the goods on the pallet, a forklift would position its lifting forks between the top and bottom surfaces and lift the pallet and goods as a unit. In most cases the wooden pallets were constructed such that the top and bottom surfaces were similar so that the pallet could be used in the same manner without regard to whether the pallet was upside-down (the bottom surface is on the top) or right-side up.

A drawback to wooden pallets is that they are subject to breakage. If the wooden planks used to construct the top surface break the pallet becomes, for the most part unusable. A further drawback is that wooden pallets can wear and degrade over time making them unusable. Still a further drawback is that often the wooden pallets are non-uniform resulting in some not being usable whatsoever. Still another drawback is that wooden pallets do not have a long service life. Rough handling, environmental factors drying or rotting the wood, pest infestation all contribute to a shortened service life for wooden pallet. Still further, the construction of wooden pallets consumes resources, i.e. wood which, while being a replenishing resource, is nonetheless a resource which should be conserved for more beneficial uses.

There is a need for a stronger, more durable, and more uniform pallet.

In Radke, Jr. U.S. Pat. No. 6,374,753 issued Apr. 13, 2003 there is disclosed a cold formed synthetic pallet. According to this patent discarded tires are shredded and mixed with shredded plastic and an epoxy binder. The materials are mixed to coat the shredded products and the mixture is poured into a pallet mold and compressed until the binder cures, adhering the products together in the shape of pallet mold.

The quality of the molded pallet described above is related to the proper mixing of the materials and binder in proper quantities. Too little binder and there is inadequate coverage of the shredded pieces which may result in areas of weakness in the finished product. Too much binder can result in extended curing times and a weakened finished product.

Still further, the finished pallet can be weakened or rejected if the materials are not properly shredded. Too large of shredded pieces can weaken the pallet. Too small of pieces and larger amounts of binder must be used.

Further, it is submitted that outdoor exposure to ultraviolet light may tend to degrade the pallet.

There is a need for a process for manufacturing a molded pallet, a composition therefore and a product produced by the process.

SUMMARY OF THE INVENTION

There is, therefore, set forth according to the present invention a molded pallet which is inexpensive to manufacture, which can be molded from products including scrap tire thermoplastic products, thereby contributing to environmental quality be reducing landfill waste by recycling, which has increased strength, durability and service life and which presents a vertical profile smaller than traditional wooden pallets to reduce wasted vertical space.

Toward this end, there is set forth a process for molding a pallet which includes mixing, in a heated chamber, crumb rubber of different size grades with ground thermoplastic, a foaming agent, a ground Kraton® polymer and a plastic adhesive. The mixing in the heated chamber is continued for a period to thoroughly mix the components. Heating in the mixing chamber is insufficient to fluidize the composition or cause the components to significantly soften. The mixed composition is then allowed to cure (cool) and then may then be bagged or packed for shipment.

The composition is then heated to a fluid state and provided as by gravity or powered injection into a mold cavity configured to define the pallet. The configuration preferably defines a square or rectangular pallet having a substantially flat top surface, and a bottom surface with depending legs to position the bottom surface above a floor sufficient to accommodate the forks of a forklift for lifting the pallet and goods positioned thereon. To add strength to the pallet the bottom surface may include a crises-cross or honeycomb pattern of webbing there along.

The materials of composition may include crumb rubber of different mesh grades which provides for varying particle sizes in the composition. The Kraton® polymer adds strength and resistance to ultraviolet degradation whereas the thermoplastic, foaming agent and adhesive define a binder for the composition which, when the composition is heated to a fluid state, expand and adhere the composition products for the desired results.

DESCRIPTION

Figure 1:
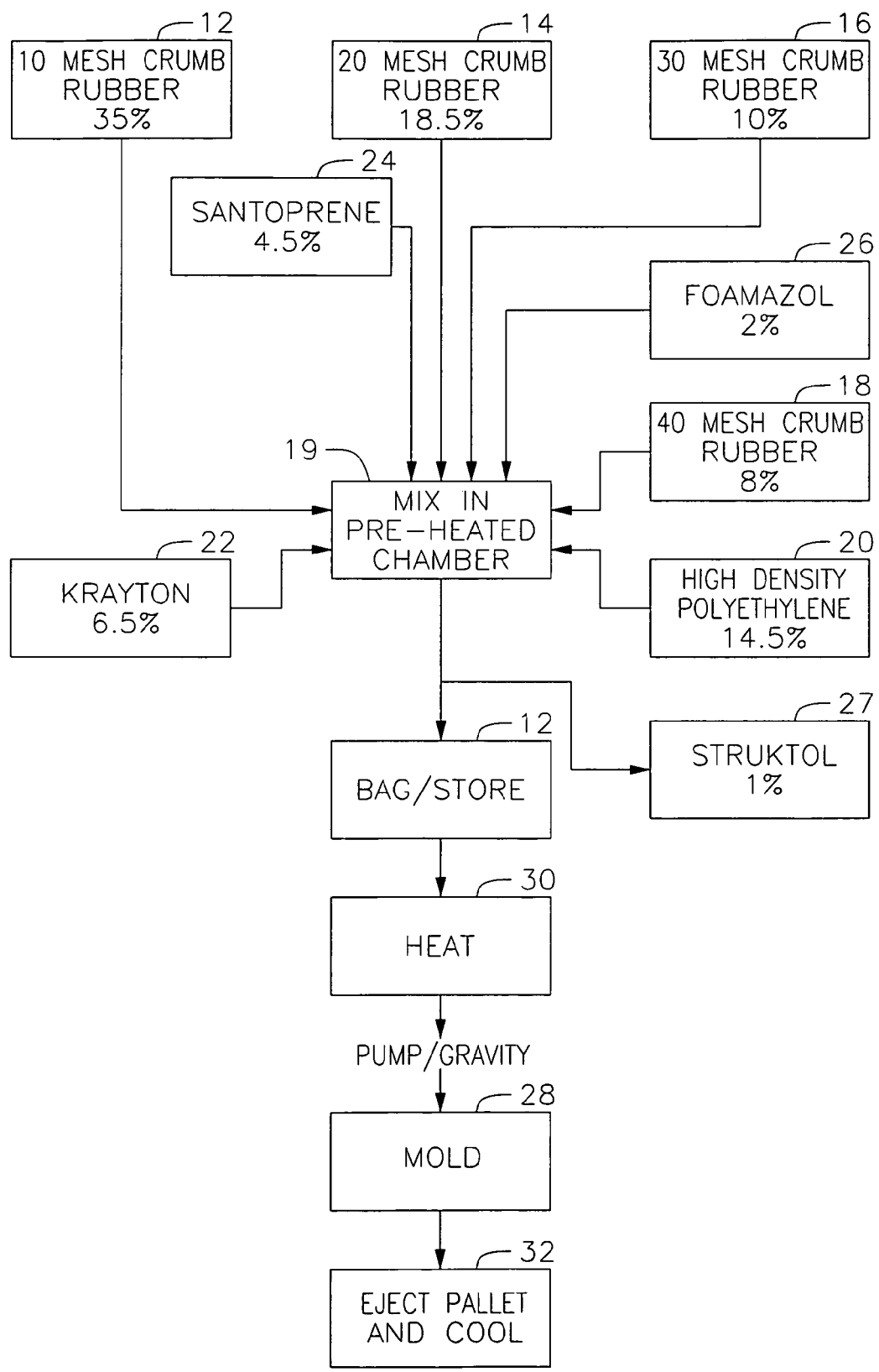
FIG. 1 graphically represents the mixing of the composition materials for future use.
Figure 2:
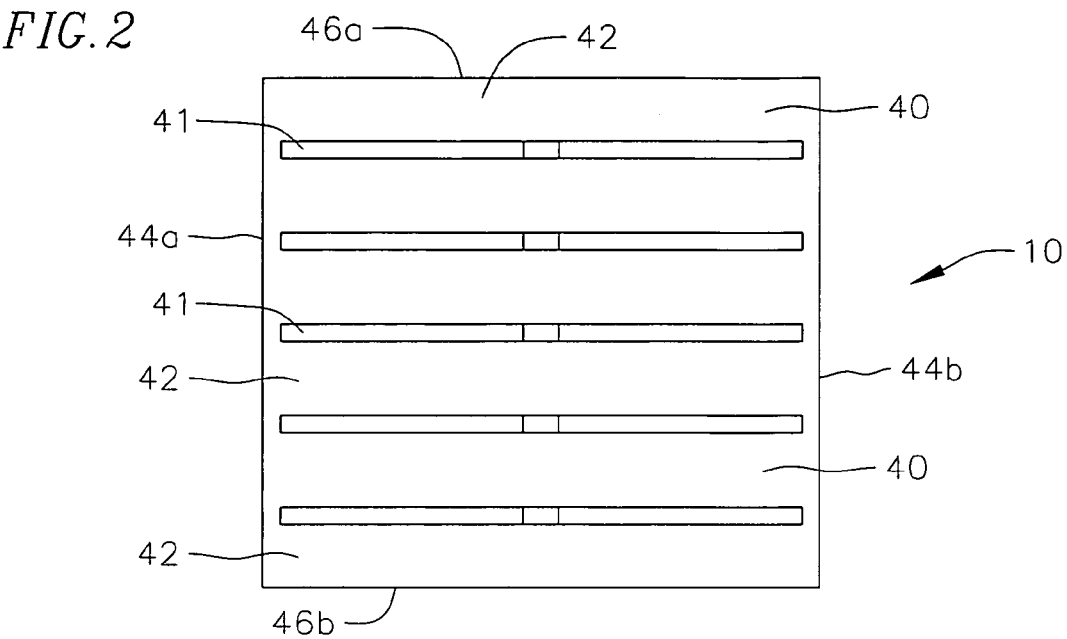
FIG. 2 is a top view of a molded pallet.
Figure 3:
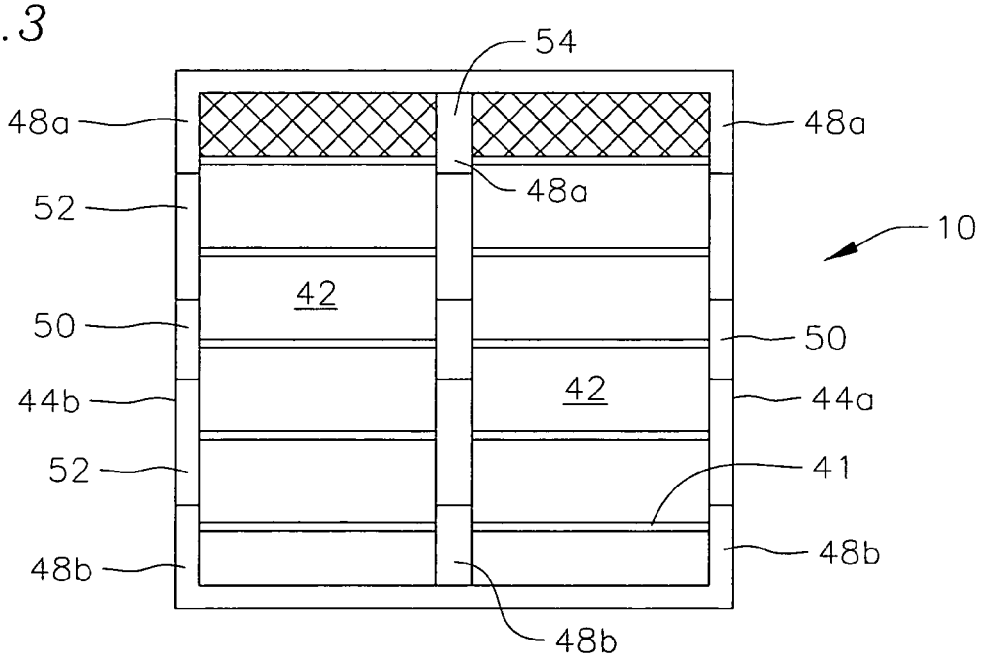
FIG. 3 is an illustrative view of the bottom of the molded pallet.
Figure 4:
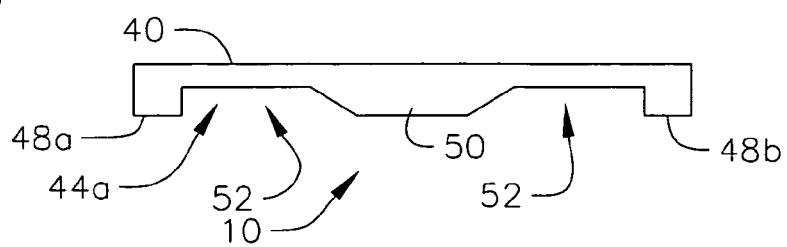
FIG. 4 is a side view of the molded pallet.
Figure 5:
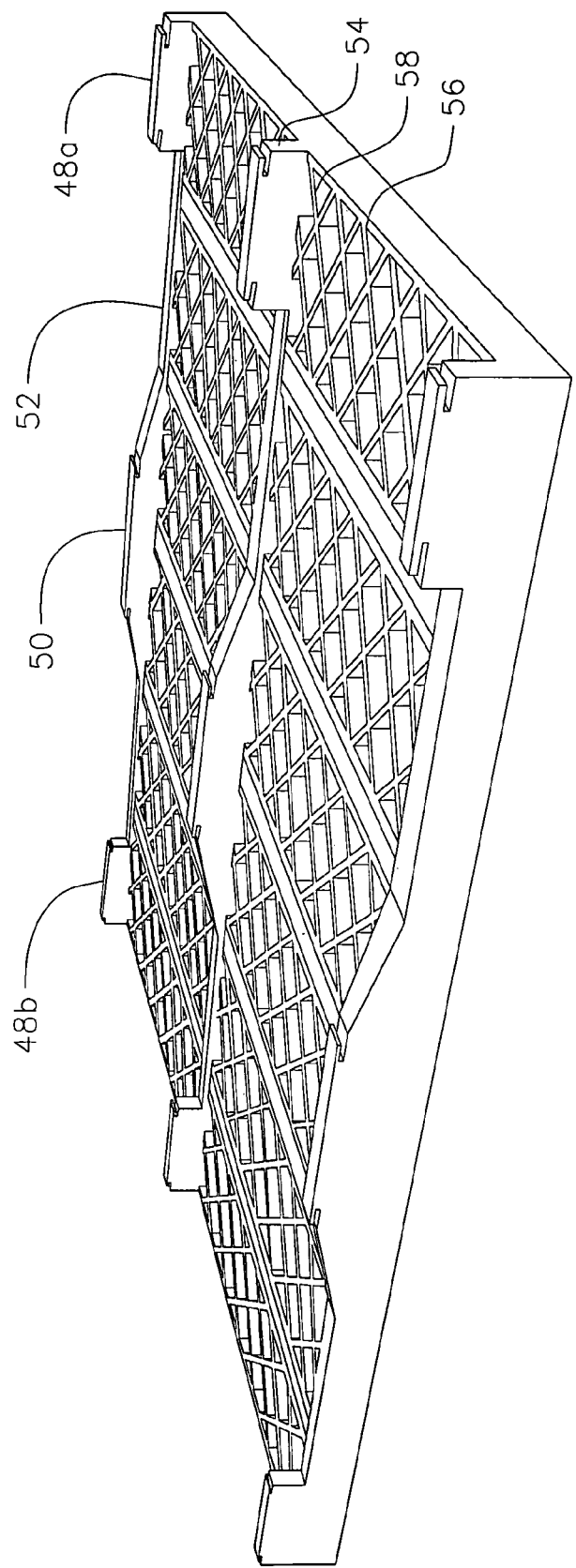
FIG. 5 is a bottom-side perspective view of the pallet.

Reference is now made to the figures wherein like parts are referred to by like numerals throughout. Turning to the drawings, FIG. 1 shows the process for forming a pallet 10 according to the present invention. At 12, 14, 16 and 18 various mesh of ground rubber (e.g. from discarded tires), is assembled. Optionally, the percentages of the mesh rubber are as set forth below:

10 Mesh Crumb Rubber 35% (by volume)
20 Mesh Crumb Rubber 18.5%
30 Mesh Crumb Rubber 10%
40 Mesh Crumb Rubber 8%

The percentages of the contribution by volume of the carious meshes of crumb rubber may be altered. For example, in an optional embodiment, a plurality of different size crumb rubber is used with the largest size being approximately 10 Mesh and the smallest being approximately 20 Mesh.

The crumb rubber components are vigorously mixed for a period of time, e.g. 24 hours, in a pre-heat chamber 19 to assure complete mixing of the rubber based component. After mixing of the rubber in the pre-heat chamber the other components are added at 20, 22, 24, 26 and 27 as follows:

| | |
|---|---|
| High Density Polyethylene | 14.5% |
| Thermoplastic elastomer in the form of a styrenic block copolymer or isoprene rubber such as Kraton ® | 6.5% (Kraton is a Registered Trademark of the Shell Oil Company) |
| Thermoplastic elastomer or thermoplastic vulcanizate such as Santoprene ® | 4.5% (Santoprene ® is a registered Trademark of Advanced Elastomer Systems, L.P.) |
| Exothermic or endothermic chemical foaming agent such as Foamazol ® | 2% (Foamazol ® is a Registered Trademark of Richard B. Leahy) |
| Aliphatic hydrocarbon or hydrocarbon resins plastic adhesive such as Struktol ® | 1% (Struktol ® is a Registered Trademark of Schill & Seilacher GmbH & Co) |

The crumb rubber with the additional components is then mixed in the pre-heat chamber for an additional period of time, e.g. 24 hours. The mixture, by the heating of the pre-heat chamber is fluidized so that thorough mixing of the components can take place. The fluid mixture can then be pelletized, cooled and bagged at 31 for future use. Alternatively the fluid mixture can be sent directly to the molding stage 28 of the process.

Assuming that the compound mixture has been pellitized, at 30 the pellets are introduced into a heated chamber which heats the pellets to a fluid state and at a sufficient temperature to render the composition flowable. At 28 the composition is poured or injected into a pallet mold to form the composition into the desired shape, such as the shape described herein. After the mold has cooled to the point that the composition is solid, at 32 the molded pallet is ejected from the mold, permitted to cool and is ready for use.

While the pallet may have any desired shape and construction, including single-piece construction or multiple-piece construction. In an optional embodiment the composition is molded into the shape shown in FIGS. 2–5. The pallet 10 has a substantially flat top surface 40 defined by a plurality of parallel arranged slats 42 separated by elongate gaps 41 to permit rain and moisture to drain from the top surface 40. Sides 44a, b depend from the top surface 40 and are separated by ends 46a, b. The sides 44a, b are configured by the shaping of the mold to define end legs 48a, b and a medial support 50 creating gaps 52 of a size to pass pallet forks of a typical pallet hoist. Further the legs 48a, b and medial support 50 act to space the top surface 40 above the ground to receive the forks of a pallet hoist thereunder.

To further provide support to the pallet 10 at least one lateral support 54 may optionally extend between the ends 46a, b and between the sides 44a, b along the bottom 56. The lateral support 45 further has defined legs 48a, b and a medial support 50 aligned with a complimenting the legs 48a, b and medial supports 50 of the sides 44a, b.

The top surface 40 has a predetermined thickness. To provide support for the top surface 40, along the bottom 56 thereof at molded webbing or brace network 58 which may be defined by of a criss-cross or honeycomb pattern of bracing as suggested in FIGS. 3 and 5. The brace network 58 provides strength to the pallet 10 which reducing the weight thereof.

While certain embodiments of the present invention have been shown and described it is to be understood that the present invention is subject to many modifications and changes without departing from the spirit and scope of the claims presented herein.

The invention claimed is:

1. A process for molding a pallet comprising:
   (i) mixing ground crumb rubber of a plurality different mesh sizes of 10 mesh and finer in a heated chamber;
   (ii) mixing with the crumb rubber mix ground polyethylene, a ground elastomer selected from the group consisting of styrenic block copolymers and isoprene rubbers, a thermoplastic elastomer, a foaming agent and a plastic adhesive in said heated chamber;
   (iii) heating the composition from step (ii) to a fluid state;
   (iv) injecting the fluid composition into a mold configured in the shape of said pallet and retaining the same for a period of time for the composition to cure; and
   (v) removing the molded pallet from the mold.

2. The process of claim 1 comprising selecting the crumb rubber from a group substantially consisting of 10 mesh, 20 mesh, 30 mesh and 40 mesh.

3. The process of claim 2 comprising for steps (i) and (ii) providing the composition components according to the following proportions, 35% 10 mesh crumb rubber, 18.5% 20 mesh crumb rubber, 10% 30 mesh crumb rubber, 8% 40 mesh crumb rubber, 14.5% polyethylene, 6.5% elastomer selected from the group consisting of styrenic block copolymers and isoprene rubbers, 4.5% thermoplastic elastomer, 2% foaming agent and 1% plastic adhesive.

4. The process of claim 1 wherein said thermoplastic elastomer is a thermoplastic vulcanizate.

5. The process of claim 1 wherein said plastic adhesive is selected from the group consisting of aliphatic hydrocarbons and hydrocarbon resins.

6. A process for manufacturing a pallet comprising:
   mixing and heating in a chamber a composition consisting essentially of 35% 10 mesh crumb rubber, 18.5% 20 mesh crumb rubber, 10% 30 mesh crumb rubber, 8% 40 mesh crumb rubber, 14.5% polyethylene, 6.5% elastomer selected from the group consisting of styrenic block copolymers and isoprene rubbers, 4.5% thermoplastic elastomer, 2% foaming agent and 1% plastic adhesive, said heating being insufficient to transform the composition into a fluid state;
   providing a mold cavity configured to define said pallet;
   prior to injecting the composition into said cavity, heating the composition to a fluid state;
   supplying the fluidized composition into the mold cavity, said composition assuming the form of the cavity;
   retaining the composition in the cavity for a period of time for the composition to harden; and
   removing the molded pallet from the cavity.

7. The process of claim 6 comprising providing said cavity to have a configuration to define, for the molded pallet, a top surface and a bottom surface, said bottom surface including a plurality of projecting legs and a criss-cross webbing.

8. The process of claim 7 comprising providing said cavity to have a configuration to define a rectangular pallet.

* * * * *